(12) United States Patent
Kishi et al.

(10) Patent No.: US 8,414,190 B2
(45) Date of Patent: Apr. 9, 2013

(54) TRACK RAIL AND MOTION GUIDANCE APPARATUS INCLUDING THE TRACK RAIL

(75) Inventors: Hiroyuki Kishi, Tokyo (JP); Shinya Mori, Tokyo (JP); Takeshi Shimamura, Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 12/674,994

(22) PCT Filed: Sep. 5, 2008

(86) PCT No.: PCT/JP2008/066062
§ 371 (c)(1),
(2), (4) Date: Feb. 24, 2010

(87) PCT Pub. No.: WO2009/034923
PCT Pub. Date: Mar. 19, 2009

(65) Prior Publication Data
US 2011/0110615 A1    May 12, 2011

(30) Foreign Application Priority Data
Sep. 14, 2007   (JP) .................................. 2007-240261

(51) Int. Cl.
*F16C 29/04*   (2006.01)

(52) U.S. Cl. ................. 384/55; 384/45; 384/49

(58) Field of Classification Search ........... 384/8, 13, 384/15, 43–45, 49, 53, 55
See application file for complete search history.

(56) References Cited

U.S. PATENT DOCUMENTS

| | | | | |
|---|---|---|---|---|
| 4,391,473 A | * | 7/1983 | Teramachi | 384/43 |
| 4,428,627 A | * | 1/1984 | Teramachi | 384/45 |
| 4,441,765 A | * | 4/1984 | Kasai et al. | 384/45 |
| 4,489,990 A | * | 12/1984 | Teramachi | 384/43 |
| 4,496,196 A | * | 1/1985 | Teramachi | 384/45 |
| 4,630,872 A | * | 12/1986 | Teramachi | 384/45 |
| 4,636,094 A | * | 1/1987 | Teramachi | 384/44 |
| 5,044,780 A | * | 9/1991 | Teramachi | 384/44 |
| 5,108,197 A | | 4/1992 | Morita | |

(Continued)

FOREIGN PATENT DOCUMENTS

| | | |
|---|---|---|
| JP | 59147918 | 10/1984 |
| JP | 3-277811 | 12/1991 |
| JP | 2649743 | 9/1997 |
| JP | 2000-055047 | 2/2000 |

OTHER PUBLICATIONS

International Search Report, PCT/JP2008/066062, Oct. 7, 2008.

*Primary Examiner* — Marcus Charles
(74) *Attorney, Agent, or Firm* — Young & Thompson

(57) ABSTRACT

Rigidity and precision of a motion guidance apparatus are increased by improving track rail shape. A track rail has at least two rolling member rolling grooves (RMRGs) on the upper surface and at least one RMRG on each side surface, the RMRGs extending in the longitudinal direction. When the RMRGs are taken along a cross-sectional plane perpendicular to the longitudinal direction of the track rail, and two imaginary lines extending vertically downward are drawn from ends of the respective grooves located on the outer sides among upper surface RMRGs, all the side surface RMRG are positioned in the rail but outside the corresponding one of the two imaginary lines, and at least portions of the upper surface and the side surfaces of the track rail, on which the RMRGs are formed, the portions being in the vicinity of the respective RMRGs, are formed with an inclination angle.

15 Claims, 9 Drawing Sheets

U.S. PATENT DOCUMENTS

| | | | |
|---|---|---|---|
| 5,273,365 A * | 12/1993 | Kondoh | 384/44 |
| 5,755,516 A * | 5/1998 | Teramachi et al. | 384/45 |
| 6,231,238 B1 | 5/2001 | Teramachi | |
| 6,261,001 B1 * | 7/2001 | Teramachi | 384/44 |
| 6,312,158 B1 * | 11/2001 | Teramachi et al. | 384/36 |
| 6,352,366 B1 * | 3/2002 | Schneeberger et al. | 384/45 |
| 6,550,969 B1 * | 4/2003 | Mischler | 384/44 |

\* cited by examiner

TRACK RAIL AND MOTION GUIDANCE APPARATUS INCLUDING THE TRACK RAIL

CROSS REFERENCE TO RELATED APPLICATIONS

This application claims the benefit of priority to PCT JP 2008/066062, filed on Sep. 5, 2008, and JP 2007-240261, filed on Sep. 14, 2007, both of the disclosures of which are incorporated herein by reference in their entireties.

TECHNICAL FIELD

The present invention relates to a track rail improved to increase the rigidity and precision of a motion guidance apparatus and a motion guidance apparatus including the track rail.

BACKGROUND ART

There has been a known motion guidance apparatus that includes a track rail and a movable block assembled to the track rail via a plurality of rolling members so that the movable block can make reciprocating motion relative to the track rail along the longitudinal direction thereof.

FIGS. 7 and 8 show typical, known configurations of track rails used in motion guidance apparatus of this type. For example, in a track rail 101 shown in FIG. 7, rolling member rolling grooves 103 to which balls 102 apply loads are formed and aligned in the vertical direction, and the head of the track rail 101, when taken along a cross-sectional plane perpendicular to the longitudinal direction thereof, has a diamond shape with right and left corners 104 protruding sideways. When the conventional track rail 101 shown in FIG. 7 are thus configured, the contact angle between the balls 102 and the rolling member rolling grooves 103 can be set along an oblique direction, specifically, the direction inclined by 45 degrees, whereby the ball rows are arranged in such a way that the movable block 105 receives the same load in four directions (radial direction, counter radial direction, and transverse directions). The conventional motion guidance apparatus 100 shown in FIG. 7 can thus be used in any orientation.

Making the loads in the four directions the same as described above is not necessarily achieved by providing the track rail 101 shown in FIG. 7 with the corners 104. Alternatively, it has been known that the loads in the four directions can be made the same by using a track rail 111 shown in FIG. 8, which has a rectangular cross-sectional shape taken along a plane perpendicular to the longitudinal direction thereof. In the track rail 111 having the shape shown in FIG. 8, the contact angle between balls 112 and rolling member rolling grooves 113 can be set along an oblique direction, for example, by skillfully shaping the rolling member rolling grooves 113 or skillfully arranging the rolling member rolling grooves 113 formed on the track rail 111 and rolling grooves 116 formed on a movable block 115 and facing the rolling member rolling grooves 113.

DISCLOSURE OF THE INVENTION

Problems to be Solved by the Invention

In the industry of the art in recent years, motion guidance apparatus are required to be more rigid and precise because they are used in broader applications. To meet the requirements, improvements of motion guidance apparatus of related art are desired.

In particular, focusing on the track rail of a motion guidance apparatus, for example, the track rail 101 shown in FIG. 7, one notices that the head of the track rail 101 has the right and left corners 104 protruding sideways and the track rail 101, when taken along a plane perpendicular to the longitudinal direction thereof, has a diamond cross-sectional shape. The cross-sectional shape is advantageous in setting the contact angle between the balls 102 and the rolling member rolling grooves 103 along an oblique direction, whereas the diamond shape due to the corners 104 is disadvantageous in terms of rigidity. That is, a load applied to the track rail 101, which has the diamond cross-sectional shape when taken along a plane perpendicular to the longitudinal direction, slightly deforms the rail itself. Improvements should therefore be made to the conventional track rail 101 shown in FIG. 7 to further increase the rigidity and precision of the motion guidance apparatus.

On the other hand, the shape of the track rail 111 shown in FIG. 8 seems to be preferable in terms of rigidity. However, in the track rail 101 whose cross section perpendicular to the longitudinal direction thereof has a substantially rectangular shape, when the contact angle between the balls 112 and the rolling member rolling grooves 113 is set along an oblique direction and loads are applied to the balls 112, no loaded contact surface between the balls 112 and the rolling member rolling grooves 113 can disadvantageously be left in the direction in which the contact angle is set along the oblique direction, as apparent from an enlarged schematic view of FIG. 9. The case is described below in more detail. In the configuration shown in FIG. 9, each of the rolling member rolling grooves 113 formed on the side surfaces of the track rail 111 has a reduced area of the loaded contact surface in the region above the line representing the inclined contact angle, and each of the rolling member rolling grooves 113 formed on the upper surface of the track rail 111 has a reduced area of the loaded contact surface in the region on the right of the line representing the inclined contact angle (in the region close to the center line of the rail). When each of the balls 112 receives a load and deforms in accordance with the shape of the corresponding groove, a force acts on the ball 112 so that it is shifted and slightly run on the corresponding end of the rolling member rolling groove 113. This phenomenon should be eliminated to further increase the rigidity and precision of the motion guidance apparatus.

The present invention has been made in view of the cases described above. An object of the present invention is to increase the rigidity and precision of a motion guidance apparatus by improving the shape of a track rail.

Means for Solving the Problems

A track rail according to the present invention is that used in a motion guidance apparatus including a track rail and a movable block assembled to the track rail via a plurality of rolling members so that the movable block can make reciprocating motion relative to the track rail along the longitudinal direction thereof. The track rail has at least two rolling member rolling grooves on the upper surface and at least one rolling member rolling groove on each side surface, the rolling member rolling grooves extending in the longitudinal direction. When the rolling member rolling grooves are taken along a cross-sectional plane perpendicular to the longitudinal direction of the track rail, and two imaginary lines extending downward in the vertical direction are drawn from ends of the respective grooves located on the outer sides among the at least two rolling member rolling grooves formed on the upper surface, all the at least one rolling member rolling groove formed on each side surface is positioned in the rail but outside the corresponding one of the two imaginary lines, and at least portions of the upper surface and the side surfaces of the track rail, on which the rolling member rolling grooves are formed, the portions being in the vicinity of the respective rolling member rolling grooves, are formed with an inclination angle.

In the track rail according to the present invention, the inclination angle can be formed by assuming that the upper surface of the track rail is horizontally disposed and the side surfaces of the track rail are vertically disposed, assuming an imaginary horizontal line horizontally passing through the groove curvature centers of the rolling member rolling grooves formed on the upper surface and an imaginary vertical line vertically passing through the groove curvature centers of the rolling member rolling grooves formed on each of the side surfaces, grouping the rolling member rolling grooves formed on one side surface and the rolling member rolling grooves formed on the upper surface and positioned in the vicinity of the rolling member rolling grooves on the one side surface into one set, grouping the rolling member rolling grooves formed on the other side surface and the rolling member rolling grooves formed on the upper surface and positioned in the vicinity of the rolling member rolling grooves on the other side surface into another set, and rotating the upper surface and the side surface in the two sets around the intersection of the imaginary horizontal line and the imaginary vertical line assumed in the respective two sets.

In the track rail according to the present invention, each of the sets can be rotated around the intersection of the imaginary horizontal line and the imaginary vertical line in such a way that the imaginary horizontal line moves upward away from the track rail and the imaginary vertical line moves inward toward the center of the track rail.

Further, in the track rail according to the present invention, the inclination angle is preferably within a range between 10 degrees and 20 degrees inclusive.

Still further, in the track rail according to the present invention, the formed rolling member rolling grooves can be eight in number, four on the upper surface and two on each of the side surfaces.

It is also possible to form a motion guidance apparatus including any of the track rails according to the invention described above.

Effects of the Invention

According to the present invention, a novel track rail capable of increasing the rigidity and precision of a motion guidance apparatus can be provided.

REFERENCE NUMERALS

10 track rail, 10a upper surface, 10b, 10b$_1$, 10b$_2$ side surface, 11 rolling member rolling groove, 12 bolt hole, 20 motion guidance apparatus, A imaginary line, B imaginary horizontal line, C imaginary vertical line, P, Q groove curvature center, R intersection, 100 conventional motion guidance apparatus, 101, 111 track rail, 102, 112 ball, 103, 113 rolling member rolling groove, 104 corner, 105, 115 movable block, 116 rolling groove

MODE FOR CARRYING OUT THE INVENTION

A preferred embodiment for implementing the present invention will be described below with reference to the drawings. It is noted that the following embodiment does not limit the invention set forth in the claims and all combinations of the features described in the embodiment are not necessarily essential for "MEANS FOR SOLVING THE PROBLEMS."

Figure 1:
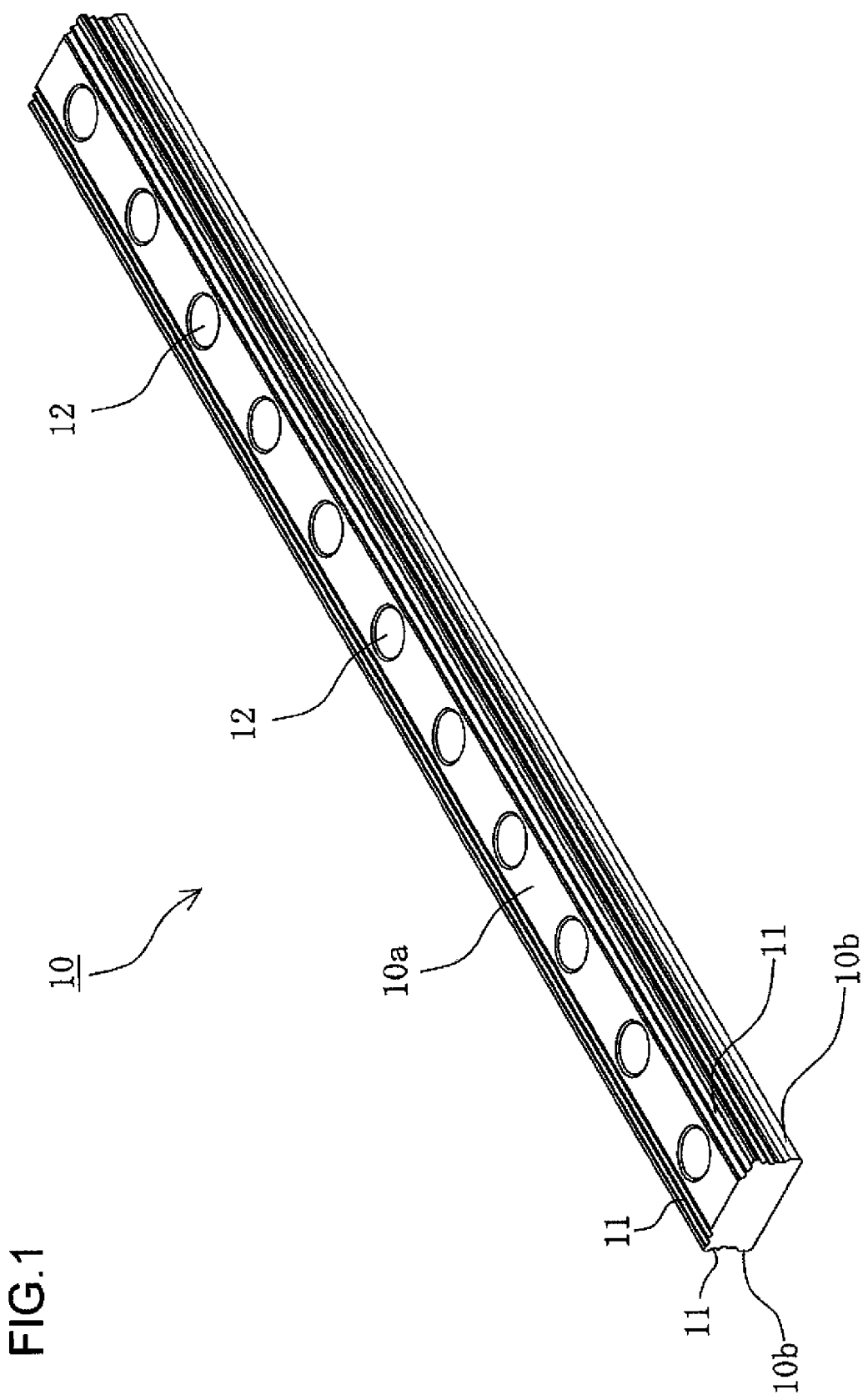
FIG. 1 is an exterior perspective view of a track rail according to the present embodiment.
Figure 2:
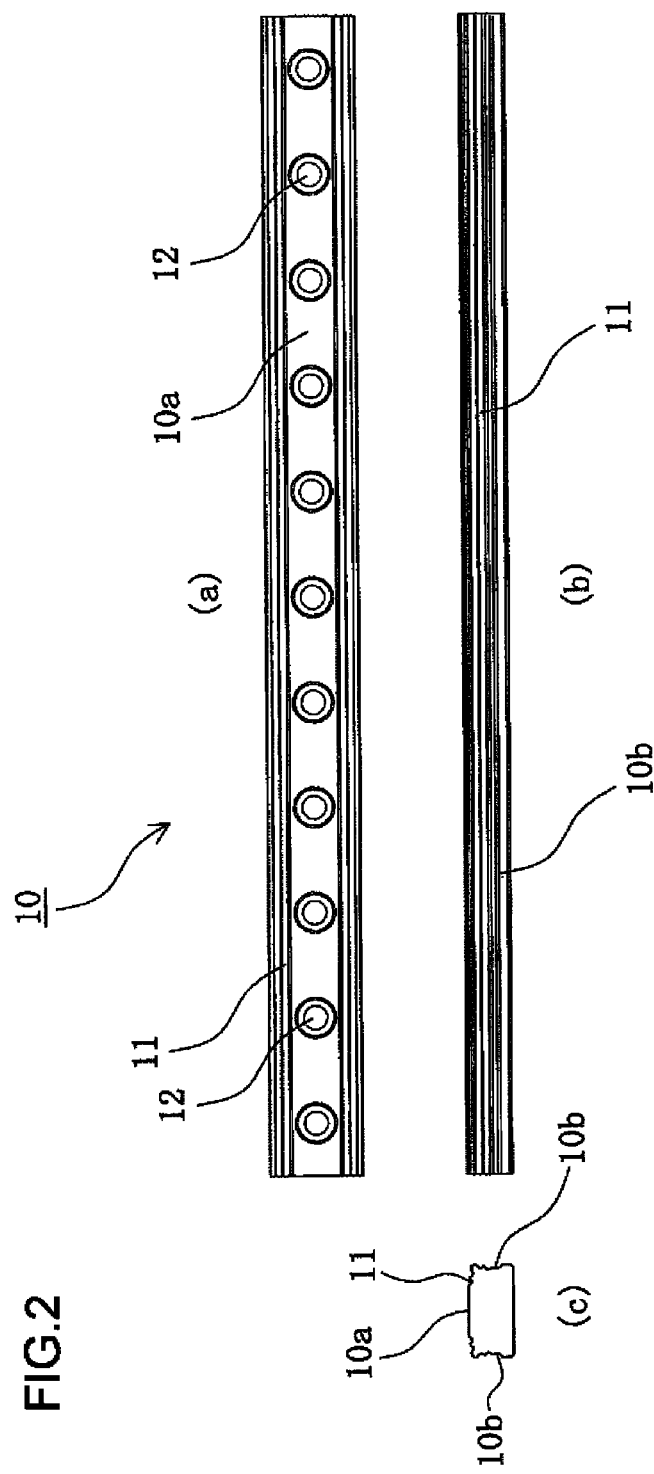
FIG. 2 is a descriptive view of the track rail according to the present embodiment, and (a), (b), and (c) in FIG. 2 show the upper surface, one of the side surfaces, and the front surface of the track rail, respectively.
Figure 3:
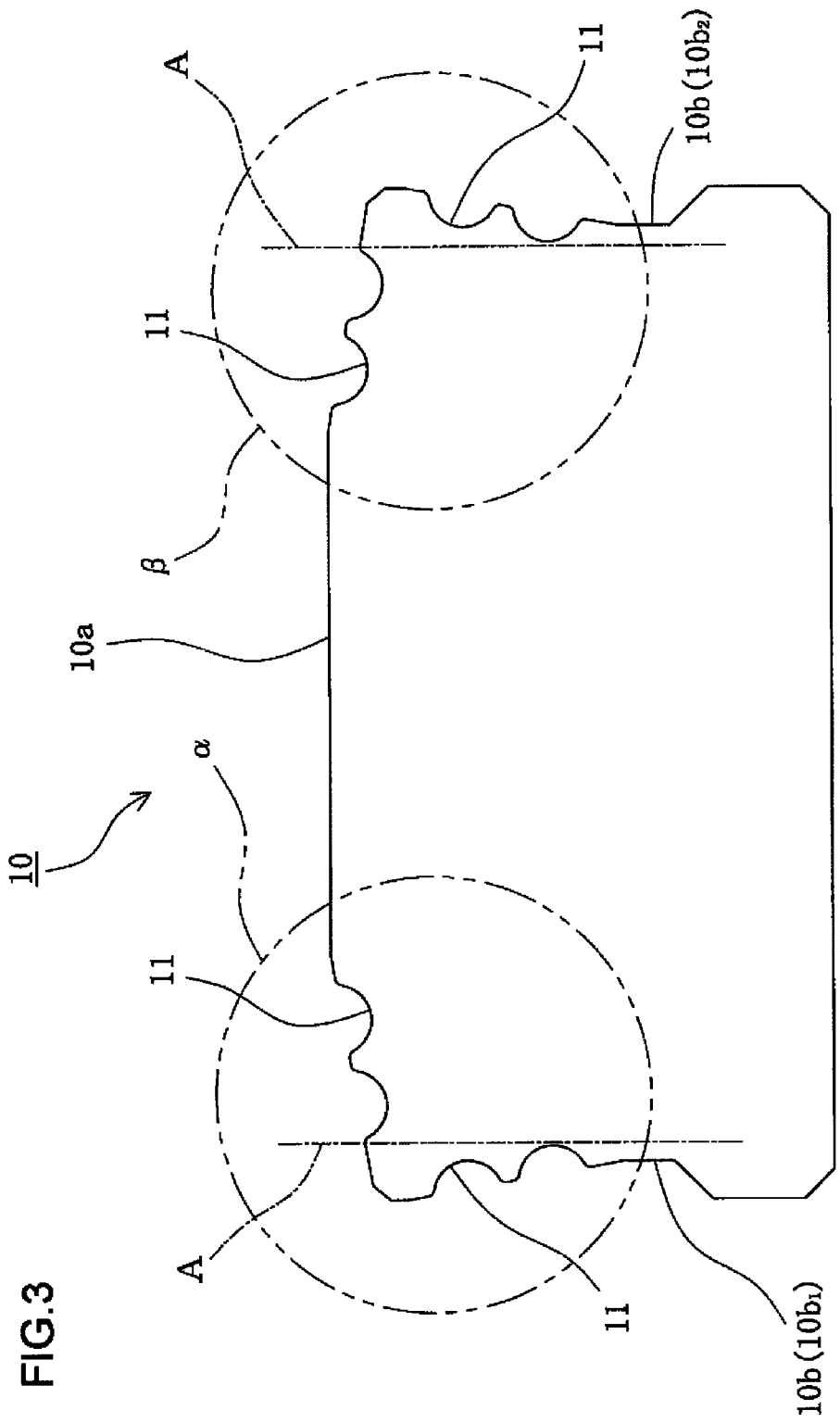
FIG. 3 shows a characteristic shape of the front surface of the track rail according to the present embodiment.

FIG. 1 is an exterior perspective view of a track rail according to the present embodiment. FIG. 2 is a descriptive view of the track rail according to the present embodiment, and (a), (b), and (c) in FIG. 2 show the upper surface, one of the side surfaces, and the front surface of the track rail, respectively. FIG. 3 shows a characteristic shape of the front surface of the track rail according to the present embodiment.

The track rail 10 according to the present embodiment shown in FIGS. 1 to 3 is a member that can be part of a motion guidance apparatus. A plurality of rolling member rolling grooves 11 extending in the longitudinal direction are formed on the external surface of the track rail 10, and a movable block is assembled to the track rail 10 via a plurality of balls (not shown) rollably incorporated in the plurality of rolling member rolling grooves 11. In the track rail 10 according to the present embodiment shown in FIGS. 1 to 3, four rolling member rolling grooves 11 are formed on the upper surface 10a of the track rail 10 and two rolling member rolling grooves 11 are formed on each of the side surfaces 10b of the track rail 10. That is, eight rolling member rolling grooves 11 in total are formed on the track rail 10 according to the present embodiment. In particular, the rolling member rolling grooves 11 formed on the upper surface 10a form pairs of two grooves, which are shifted toward the respective outer ends in the width direction of the upper surface of the track rail 10. The rolling member rolling grooves 11, 11 on the upper surface 10a thus form the pairs of two grooves.

The cross-sectional shape of the track rail 10 according to the present embodiment perpendicular to the longitudinal direction does not change throughout the longitudinal direction, which allows the movable block (not shown) to make reciprocating motion along the longitudinal direction of the track rail 10 in a stable manner.

Further, the track rail 10 according to the present embodiment has a plurality of bolt holes 12 disposed along the center line of the upper surface 10a and passing through the track rail 10 in the vertical direction. The track rail 10 according to the present embodiment can be reliably fixed by using the plurality of bolt holes 12. Specifically, bolts introduced through the bolt holes 12 are screwed into threaded attachment holes formed in an attachment base, such as a bench, and reliably pressing the head of each of the bolts against a counter bore formed in the corresponding bolt hole 12 allows the track rail 10 to be fixed reliably to the base.

The schematic configuration of the track rail 10 according to the present embodiment has been described above. The most characteristic point of the track rail 10 according to the present embodiment lies in the front shape of the track rail (that is, the cross-sectional shape of the track rail 10 perpendicular to the longitudinal direction thereof). A significant characteristic point of the track rail 10 according to the present embodiment will be described with reference to FIG. 3.

First, in the track rail 10 according to the present embodiment, draw two imaginary lines A, A extending downward in the vertical direction from ends of the respective grooves located on the outer sides among the four rolling member rolling grooves 11 formed on the upper surface 10a. Both the two rolling member rolling grooves 11 formed on each of the side surfaces are positioned in the rail but positioned outside the corresponding one of the two imaginary lines A, A. This configuration is employed in consideration of preventing decrease in rigidity, which is the concern due to the shape of the corners 104 in the related art. The track rail 10 can maintain high rigidity by forming the rolling member rolling grooves 11 on the track rail 10 in such a way that the rolling member rolling grooves 11 formed on the side surfaces 10b do not overlap with the area vertically below the rolling member rolling grooves 11 formed on the upper surface 10a.

Further, the track rail 10 according to the present embodiment is characterized in that at least portions of the upper surface 10a and the side surfaces 10b of the track rail 10, on which the rolling member rolling grooves 11 are formed, the portions being in the vicinity of the respective rolling member rolling grooves 11, are formed with an inclination angle.

Figure 9:
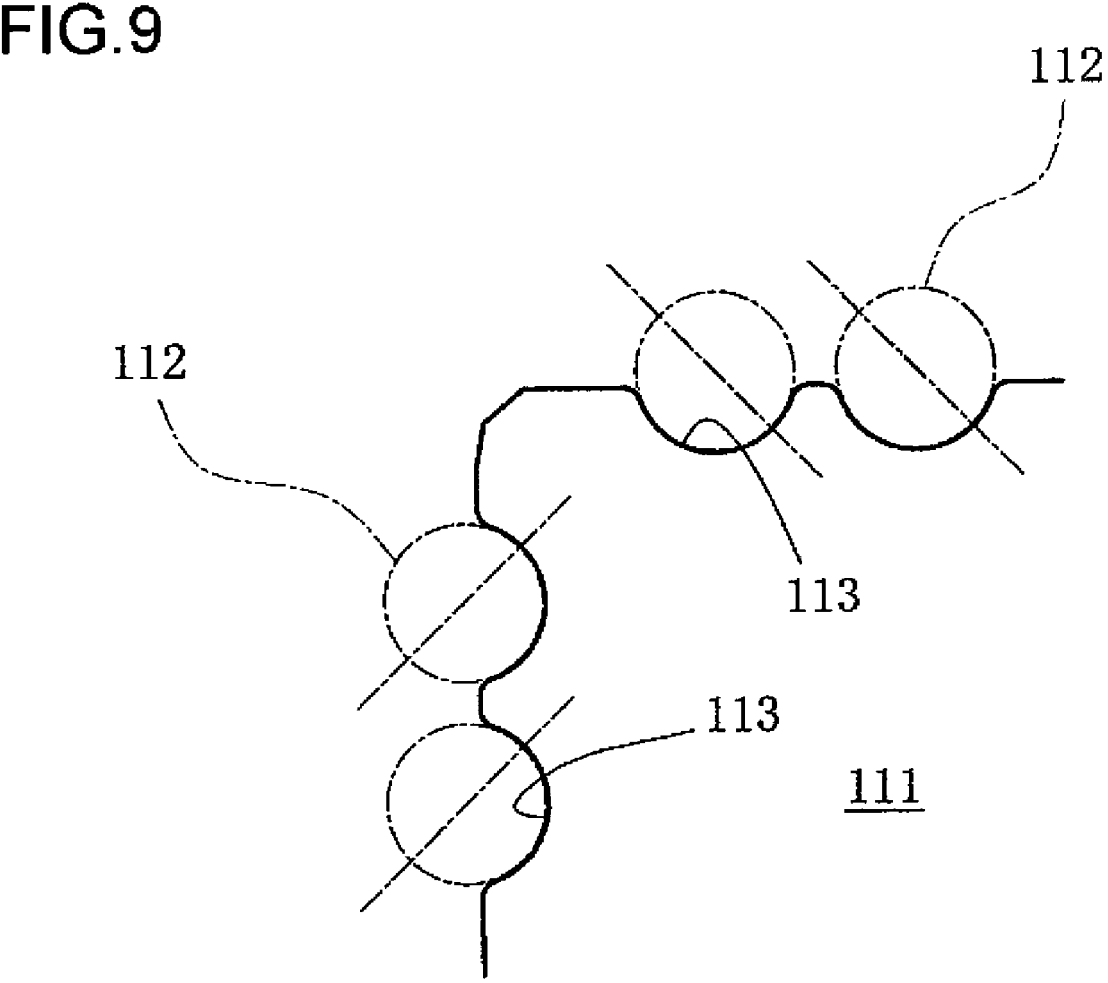
FIG. 9 is an enlarged view of a key portion of the other motion guidance apparatus of related art shown in FIG. 8.

This configuration solves the case of the related art described with reference to FIG. 9, that is, when the contact angle between the balls 112 and the rolling member rolling grooves 113 is set along an oblique direction, the case of an insufficient area of the loaded contact surface between the balls 112 and the rolling member rolling grooves 113 in the direction in which the contact angle is inclined. That is, in the track rail 10 according to the present embodiment, since the portions in the vicinity of the rolling member rolling grooves 11 are formed with an inclination angle, as shown in FIG. 3, and the inclination angle is determined in consideration of the inclined contact angle between the balls (not shown) and the rolling member rolling grooves 11, the balls will not run off the rolling member rolling grooves 11 and hence the loaded contact surface between the balls and the rolling member rolling grooves 11 is left even when the balls receive loads and hence deform in accordance with the shape of the rolling member rolling grooves 11. The rolling member rolling grooves 11 can therefore reliably accommodate the balls. The thus configured track rail 10 according to the present embodiment can increase the rigidity and precision of the motion guidance apparatus.

Figure 8:
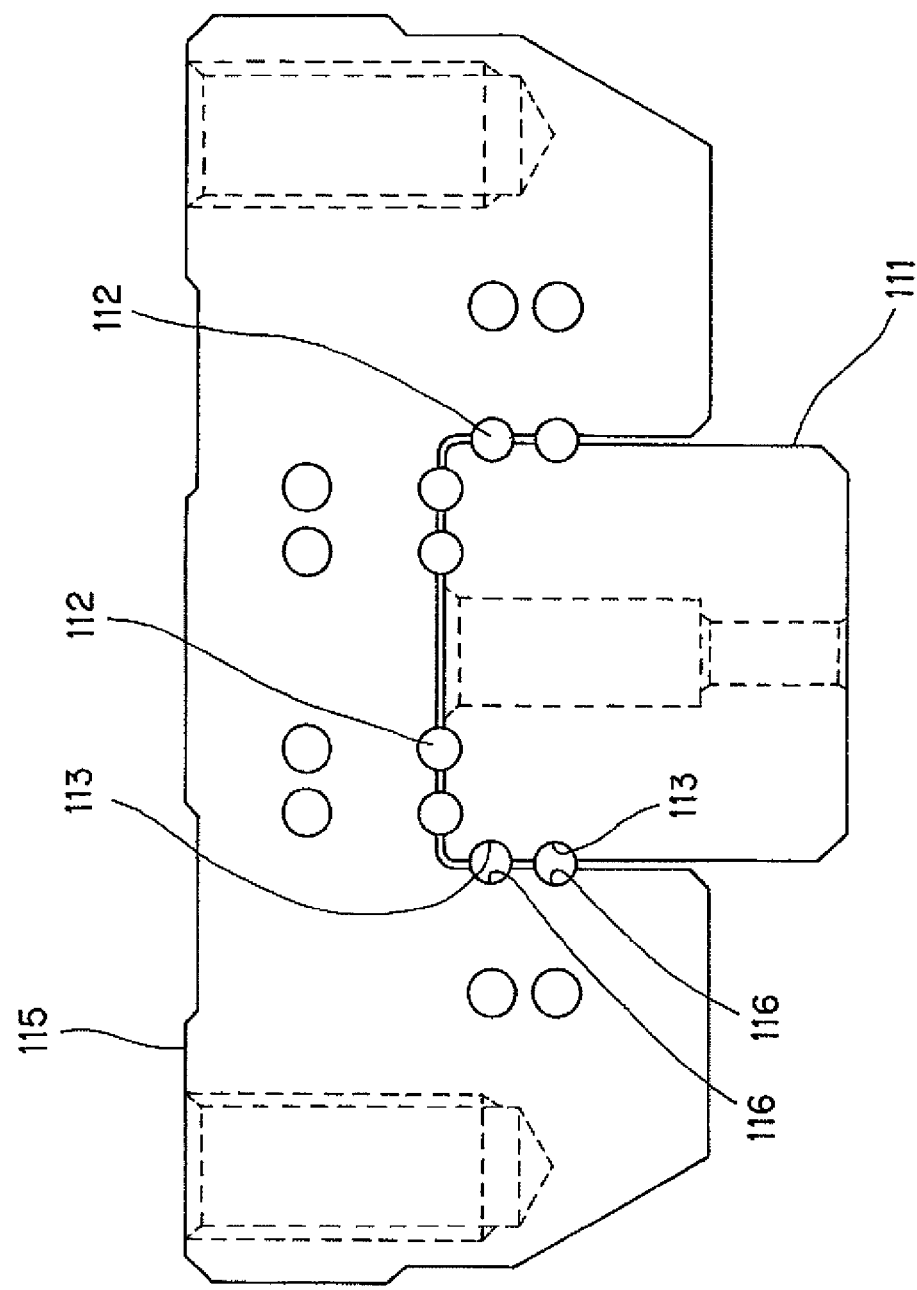
FIG. 8 is a longitudinal cross-sectional view describing the configuration of another motion guidance apparatus of related art.

It is noted that the configuration having portions with an inclination angle provides a more advantageous effect when the plurality of incorporated balls have respective retainer. That is, in a motion guidance apparatus including retainer-provided ball rows, the effective depth of the rolling member rolling grooves is shallower than that of the rolling member rolling grooves with no retainer. Therefore, in the track rail 111 of the related art described with reference to FIGS. 8 and 9, the balls 112 more likely run off the rolling member rolling grooves 113. In the track rail 10 according to the present embodiment, however, the rolling member rolling grooves 11 always reliably accommodate the balls because the portions with an inclination angle are provided even when each of the rolling member rolling grooves 11 has an effective shallow depth due to the presence of retainer, and hence the balls will not run off the rolling member rolling grooves 11. The track rail 10 according to the present embodiment is proved to be superior also from this regard.

Figure 4:
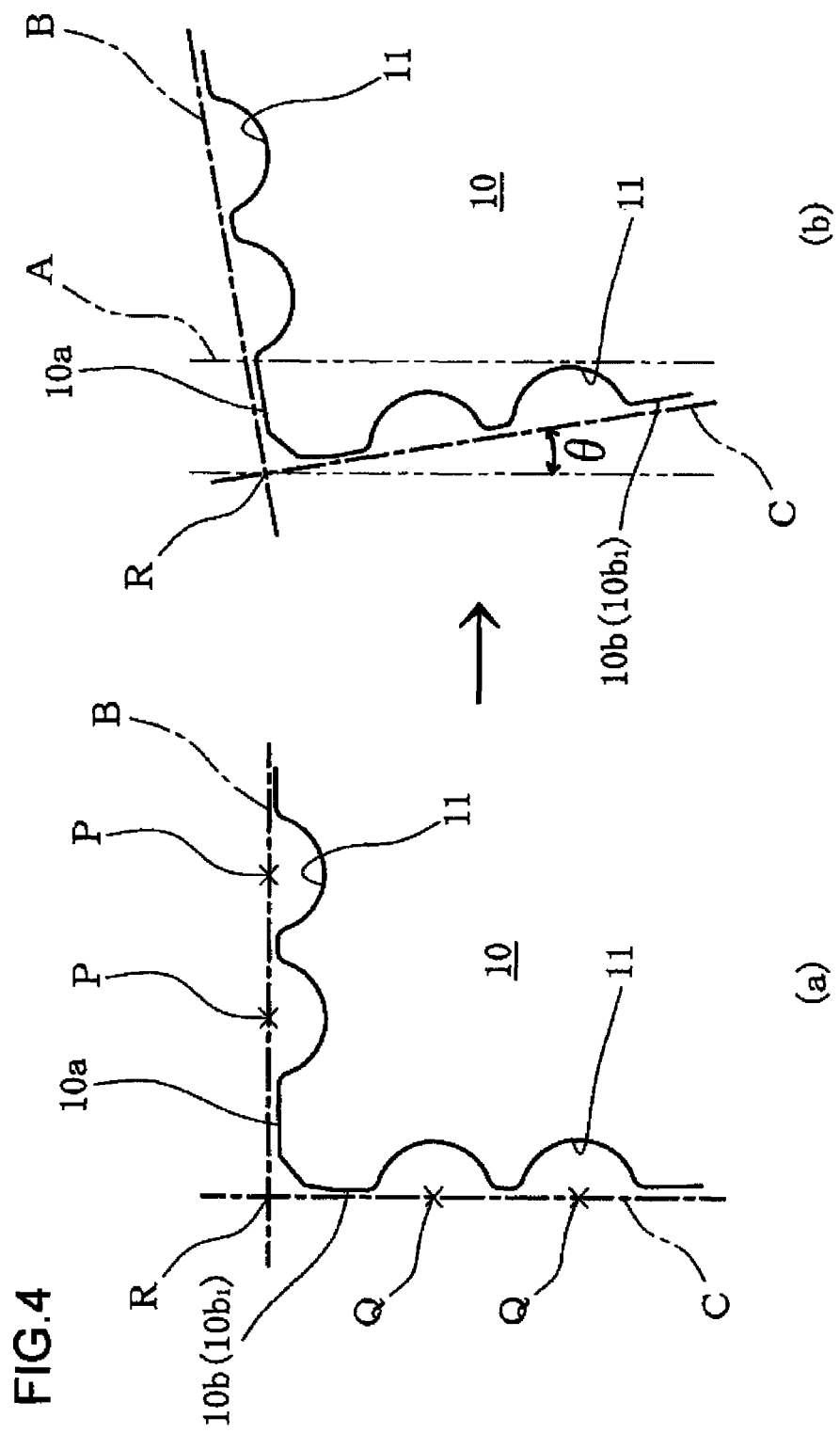
FIG. 4 is a descriptive view of a method for providing an inclination angle in the vicinity of rolling member rolling grooves formed on the upper surface and the side surfaces of the track rail according to the present embodiment.

A method for providing the above inclination angle will be described in detail with reference to FIGS. 3 and 4. FIG. 4 is a descriptive view of a method for providing an inclination angle in the vicinity of the rolling member rolling grooves 11 formed on the upper surface 10a and the side surfaces 10b of the track rail 10 according to the present embodiment.

To determine the inclination angle, first assume that the upper surface 10a of the track rail 10 is horizontally disposed and the side surfaces $10b_2$, $10b_2$ of the track rail 10 are vertically disposed, and also assume an imaginary horizontal line B horizontally passing through the groove curvature centers P of the rolling member rolling grooves 11 formed on the upper surface 10a and an imaginary vertical line C vertically passing through the groove curvature centers Q of the rolling member rolling grooves 11 formed on each of the side surfaces $10b_2$, $10b_2$, as shown in (a) of FIG. 4.

Then, the rolling member rolling grooves 11 formed on one side surface $10b_2$ (the left side surface in the plane of FIG. 3) and the rolling member rolling grooves 11 formed on the upper surface 10a and positioned in the vicinity of the rolling member rolling grooves 11 on the one side surface $10b_2$ (positioned on the upper surface 10a on the left in the plane of FIG. 3) are grouped into one set α, and the upper surface 10a and the side surface 10b in the one set α are rotated around the intersection R of the imaginary horizontal line B and the imaginary vertical line C, which have been assumed above. An inclination angle θ is thus provided (see (b) in FIG. 4).

The inclination angle described above can be provided in the same manner, for example, for the set of the rolling member rolling grooves 11 formed on the right side and labeled with the character β shown in FIG. 3. The rolling member rolling grooves 11 formed on the other side surface $10b_2$ (the right side surface in the plane of FIG. 3) and the rolling member rolling grooves 11 formed on the upper surface 10a and positioned in the vicinity of the rolling member rolling grooves 11 on the other side surface $10b_2$ (positioned on the upper surface 10a on the right in the plane of FIG. 3) are grouped into the other set β, and the upper surface 10a and the side surface $10b_2$ in the other set β are rotated around the intersection R of the imaginary horizontal line B and the imaginary vertical line C, which have been assumed above. The track rail 10 with the inclination angles shown in FIG. 3 is thus provided.

In the track rail 10 with the inclination angles thus provided according to the present embodiment, the inclination angle θ has been provided by rotating the one set α around the intersection R counterclockwise in the plane of FIG. 3, resulting in a shape in which a lower portion of the side surface $10b_1$ is inclined inward into the rail and a central portion of the upper surface 10a is inclined upward away from the rail. The inclination angle θ is also provided by rotating the other set β around the intersection R clockwise in the plane of FIG. 3, resulting in a shape in which a lower portion of the side surface $10b_2$ is inclined inward into the rail and a central portion of the upper surface $10a$ is inclined upward away from the rail.

Figure 6:
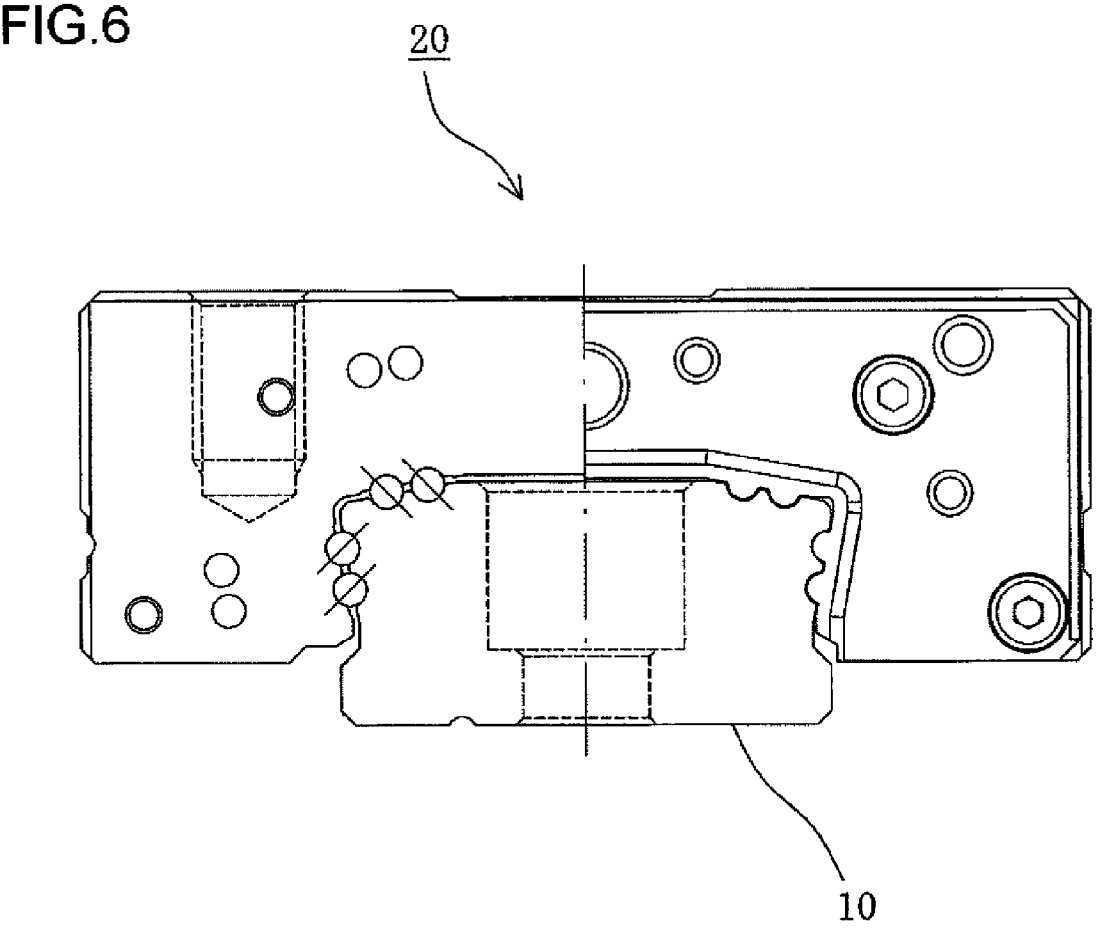
FIG. 6 is a partial longitudinal cross-sectional front view of the motion guidance apparatus using the track rail according to the present embodiment.
Figure 7:
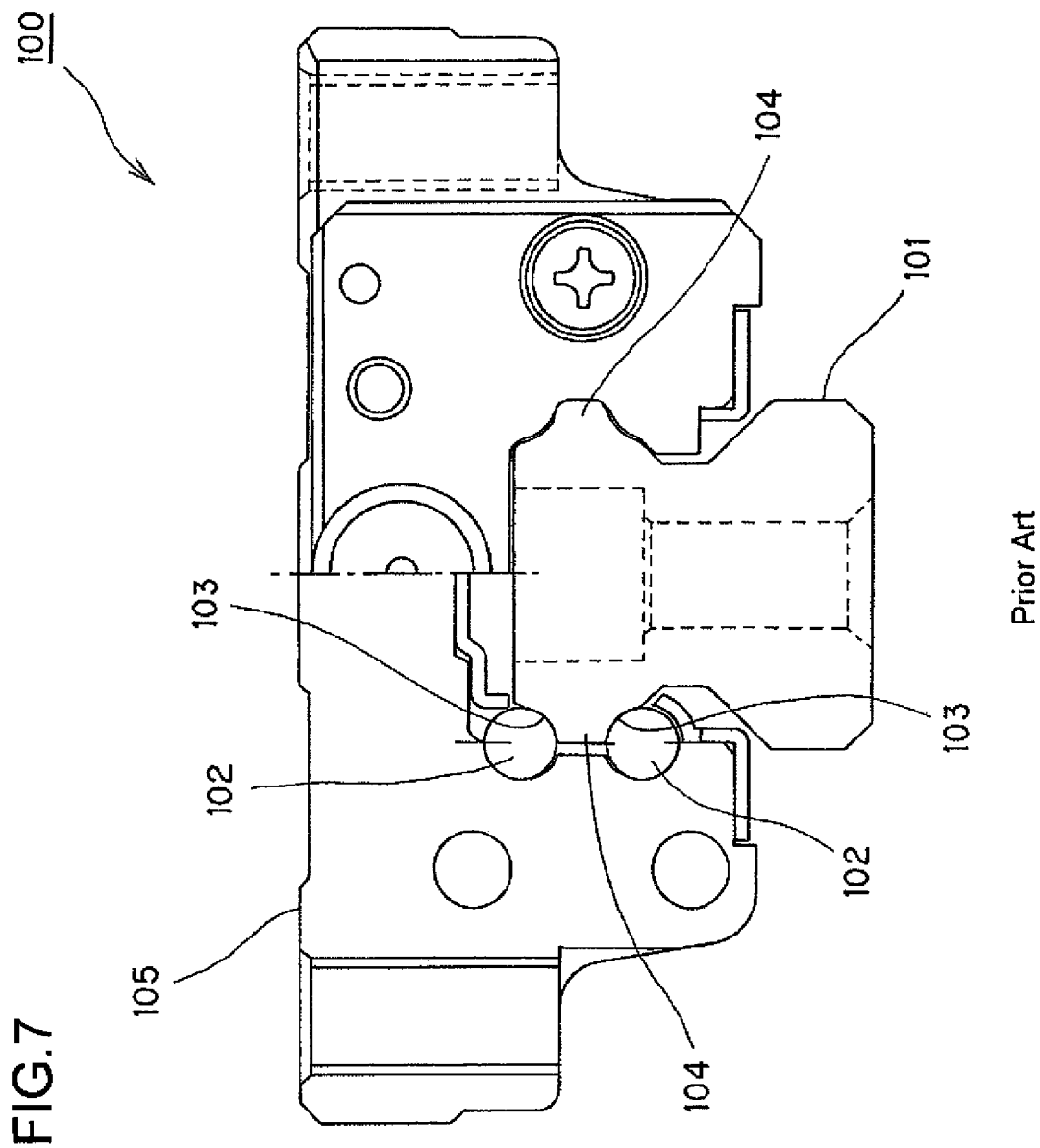
FIG. 7 is a partial longitudinal cross-sectional view describing the configuration of a motion guidance apparatus of related art.

In the track rail 10 according to the present embodiment, on the upper surface $10a$, the inclination of the contact angle between the balls and the rolling member rolling grooves 11 is oriented toward the center of the rail, whereas on each of the side surfaces $10b$, the inclination of the contact angle is oriented obliquely upward away from the rail (see FIG. 6, for example). To this end, each of the sets $\alpha$ and $\beta$ is rotated around the intersection R of the imaginary horizontal line B and the imaginary vertical line C in such a way that the imaginary horizontal line B moves upward away from the track rail 10 and the imaginary vertical line C moves inward toward the center of the track rail 10. In a motion guidance apparatus using the track rail 10 according to the present embodiment, setting the inclination of the contact angle to be oriented along the direction described above allows the same load to act on the movable block in the four directions (radial direction, counter radial direction, and transverse directions), whereby the motion guidance apparatus can be used in any orientation.

Further, in the track rail 10 according to the present embodiment, since both the two rolling member rolling grooves 11 formed on each of the side surfaces must be positioned in the rail but outside the corresponding one of the two imaginary lines A, A from the viewpoint of rigidity, possible inclination angles $\theta$ are inevitably limited when the method for setting the inclination angle described above is used, as shown in (b) of FIG. 4. Moreover, the demand that the rolling member rolling grooves 11 must accommodate the balls in a preferred manner limits the inclination angle $\theta$ to be provided. The inventors have intensively conducted research and found that the inclination angle $\theta$ is preferably set within a range between 10 degrees and 20 degrees inclusive. The range has been found in consideration of the model numbers of existing motion guidance apparatus currently manufactured and marketed, constraints in manufacturing techniques, and other factors. Therefore, all track rails formed based on the design concept for the inclination angle described above are clearly encompassed in the technical scope of the present invention, for example, even when a value outside the numerical range of the inclination angle $\theta$ described above is used.

Figure 5:
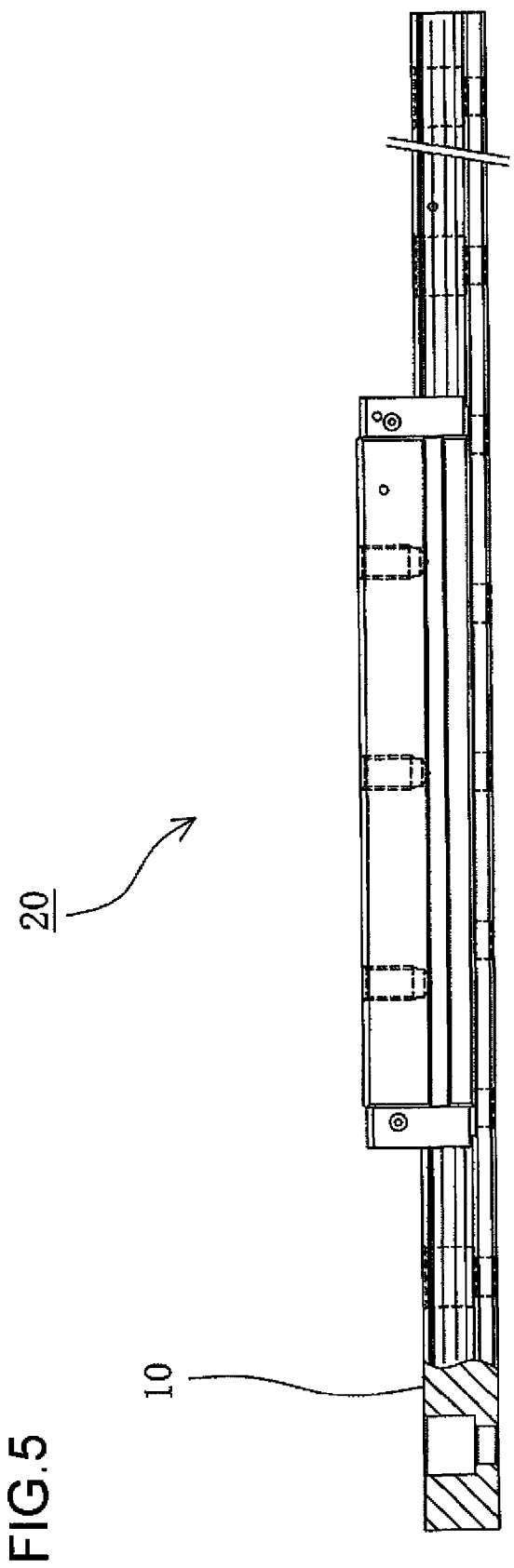
FIG. 5 is a partial longitudinal cross-sectional side view of a motion guidance apparatus using the track rail according to the present embodiment.

FIGS. 5 and 6 show an exemplary motion guidance apparatus configured by using the track rail 10 according to the present embodiment described above. FIG. 5 is a partial longitudinal cross-sectional side view of a motion guidance apparatus 20 using the track rail 10 according to the present embodiment, and FIG. 6 is a partial longitudinal cross-sectional front view of the motion guidance apparatus 20 using the track rail according to the present embodiment. The motion guidance apparatus 20 using the track rail 10 according to the present embodiment can have higher rigidity and precision than those achieved in related art. The motion guidance apparatus 20 shown in FIGS. 5 and 6 is, however, presented only by way of example among a large number of applications, and a variety of changes can be made to the motion guidance apparatus using the track rail 10 according to the present embodiment.

The preferred embodiment of the present invention has been described above, but the technical scope of the present invention is not limited to that set forth in the embodiment described above. A variety of changes or improvements can be made to the embodiment described above.

For example, the above embodiment has been described with reference to the track rail 10 on which eight rolling member rolling grooves 11 in total are formed, specifically, four on the upper surface $10a$ and two on each of the side surfaces $10b$, the number of rolling member rolling grooves 11 to be formed is not particularly limited to a specific value as long as at least two are formed on the upper surface and at least one is formed on each of the side surfaces.

Further, the track rail 10 according to the present embodiment has been described with reference to the case where each of the rolling member rolling grooves 11 has a circular arc shape. The shape of the rolling member rolling grooves, however, can be a Gothic arch shape or any other suitable shape. Since each of the rolling member rolling grooves 11 in the present embodiment described above has a circular arc shape formed of a single arc, the groove curvature center is a single point. The present invention even can be applied to a case where each of the grooves has a Gothic arch shape formed of two arcs, and the imaginary horizontal line B and the imaginary vertical line C described above can be obtained by connecting the two groove curvature centers of a Gothic arch groove. The present invention is therefore widely applicable to any groove shapes.

Further, the number, shape, and position of bolt holes 12 formed in the track rail 10 can be arbitrarily changed, and even a track rail with no bolt holes 12 can be formed. These parameters may be arbitrarily determined in accordance with the use conditions, use environment, required specifications, and other factors of the track rail according to the present invention.

It is apparent from the description of the claims that the technical scope of the present invention encompasses a variety of forms to which such changes or improvements are made.

The invention claimed is:

1. A track rail configured to be used in a motion guidance apparatus including the track rail and a movable block assembled to the track rail via a plurality of rolling members, the movable block capable of making reciprocating motion relative to the track rail along a longitudinal direction thereof, the track rail comprising:

a plurality of rolling member rolling grooves, at least two rolling member rolling grooves on an upper surface of the track rail and at least one rolling member rolling groove on each side surface of the track rail, each of the rolling member rolling grooves extending in the longitudinal direction, wherein when the rolling member rolling grooves are taken along a cross-sectional plane perpendicular to the longitudinal direction of the track rail, and two imaginary lines extending downward in the vertical direction are drawn from ends of the respective grooves located on the outer sides among the at least two rolling member rolling grooves formed on the upper surface, all of the at least one rolling member rolling groove formed on each side surface is positioned in the rail but outside the corresponding one of the two imaginary lines, at least portions of the upper surface and the side surfaces of the track rail, on which the rolling member rolling grooves are formed, the portions being in the vicinity of the respective rolling member rolling grooves, are formed with an inclination angle, the upper surface of the track rail is horizontally disposed and the side surfaces of the track rail are vertically disposed, an imaginary horizontal line is determined to be horizontally passing through the groove curvature centers of the rolling member rolling grooves formed on the upper surface and an imaginary vertical line is determined to be vertically passing through the groove curvature centers of the rolling member rolling grooves formed on each of the side surfaces, the rolling member rolling grooves formed on one side surface, and the rolling member rolling grooves formed on the upper surface and positioned in the vicinity of the rolling member rolling grooves on the one side surface are grouped together into one set, the rolling member rolling grooves formed on the other side surface, and the rolling member rolling grooves formed on the upper surface and positioned in the vicinity of the rolling member rolling grooves on the other side surface are grouped together into another set, and the inclination angle of the portions of the upper surface and the side surfaces is determined by rotating the upper surface and the side surface in the two sets around the intersection of the imaginary horizontal line and the imaginary vertical line determined in the respective two sets.

2. The track rail according to claim 1,
wherein each of the sets is rotated around the intersection of the imaginary horizontal line and the imaginary vertical line in such a way that the imaginary horizontal line moves upward away from the track rail and the imaginary vertical line moves inward toward the center of the track rail.

3. The track rail according to claim 2, wherein the inclination angle is within a range between 10 degrees and 20 degrees inclusive.

4. The track rail according to claim 3, wherein the formed rolling member rolling grooves are eight in number, four on the upper surface and two on each of the side surfaces.

5. A motion guidance apparatus comprising the track rail according to claim 3.

6. The track rail according to claim 2, wherein the formed rolling member rolling grooves are eight in number, four on the upper surface and two on each of the side surfaces.

7. A motion guidance apparatus comprising the track rail according to claim 6.

8. A motion guidance apparatus comprising the track rail according to claim 2.

9. The track rail according to claim 1,
wherein the inclination angle is within a range between 10 degrees and 20 degrees inclusive.

10. The track rail according to claim 9, wherein the formed rolling member rolling grooves are eight in number, four on the upper surface and two on each of the side surfaces.

11. A motion guidance apparatus comprising the track rail according to claim 10.

12. A motion guidance apparatus comprising the track rail according to claim 9.

13. The track rail according to claim 1,
wherein the formed rolling member rolling grooves are eight in number, four on the upper surface and two on each of the side surfaces.

14. A motion guidance apparatus comprising the track rail according to claim 13.

15. A motion guidance apparatus comprising the track rail according to claim 1.

* * * * *

UNITED STATES PATENT AND TRADEMARK OFFICE
CERTIFICATE OF CORRECTION

PATENT NO. : 8,414,190 B2
APPLICATION NO. : 12/674994
DATED : April 9, 2013
INVENTOR(S) : Hiroyuki Kishi, Shinya Mori and Takeshi Shimamura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 479 days.

Signed and Sealed this
Fourteenth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,414,190 B2                                              Page 1 of 1
APPLICATION NO.   : 12/674994
DATED             : April 9, 2013
INVENTOR(S)       : Kishi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 525 days.

Signed and Sealed this
First Day of September, 2015

Michelle K. Lee
*Director of the United States Patent and Trademark Office*